United States Patent
Farley

(10) Patent No.: US 7,297,053 B2
(45) Date of Patent: Nov. 20, 2007

(54) ROTARY CROP RESIDUE CHOPPER APPARATUS WITH STIFFENER HAVING AIR FLOW GENERATING CAPABILITY AND METHOD OF MAKING THE SAME

(75) Inventor: Herbert M. Farley, Elizabethtown, PA (US)

(73) Assignee: CNH America LLC, New Holland, PA (US)

( * ) Notice: Subject to any disclaimer, the term of this patent is extended or adjusted under 35 U.S.C. 154(b) by 209 days.

(21) Appl. No.: 11/181,638

(22) Filed: Jul. 14, 2005

(65) Prior Publication Data

US 2006/0025187 A1  Feb. 2, 2006

Related U.S. Application Data

(60) Provisional application No. 60/588,684, filed on Jul. 16, 2004.

(51) Int. Cl.
*A01F 12/40* (2006.01)
(52) U.S. Cl. ..................................................... 460/112
(58) Field of Classification Search ............... 460/112; 56/500, 294, 505, 504, DIG. 17, 249, 251; 241/243
See application file for complete search history.

(56) References Cited

U.S. PATENT DOCUMENTS

| | | | | |
|---|---|---|---|---|
| 1,060,179 A | | 4/1913 | Gonzalez | 238/89 |
| 1,121,335 A | * | 12/1914 | Dilg | 416/212 R |
| 1,479,895 A | * | 1/1924 | Franklin | 416/206 |
| 1,758,445 A | | 5/1930 | Kay | 241/282.2 |
| 2,081,807 A | | 5/1937 | Gabriel | 146/121 |
| 2,386,729 A | | 10/1945 | Watter | 85/4 |
| 2,579,119 A | * | 12/1951 | McDerment | 416/212 R |
| 2,640,309 A | | 6/1953 | Benson | 56/294 |
| 2,990,667 A | | 7/1961 | Schwalm | 56/294 |
| 3,214,897 A | | 11/1965 | Phares | 56/505 |
| 3,309,854 A | | 3/1967 | Mitchell et al. | 56/504 |
| 3,380,502 A | | 4/1968 | Grönberg | 146/123 |
| 3,397,525 A | | 8/1968 | Woodring | 56/294 |
| 3,423,920 A | | 1/1969 | Woodring et al. | 56/294 |

(Continued)

FOREIGN PATENT DOCUMENTS

AU  1373770  10/1971

(Continued)

OTHER PUBLICATIONS

P.D. Rasspe Sohne GmbH & Co. KG catalog sheet, Reference 171.0115.01, no date.

(Continued)

*Primary Examiner*—Árpád Fábián Kovács
(74) *Attorney, Agent, or Firm*—Michael G. Harms; John William Steder; Patrick M. Sheldrake

(57) ABSTRACT

A crop residue chopper for an agricultural combine, including a housing containing a rotor supporting a plurality of elongate chopper knives for rotation therewith, each of which includes at least one longitudinally extending, integral stiffener extending sidewardly therefrom which, during rotation, can generate an air flow for inducting dust and smaller particles of crop residue into the chopper for discharge from the chopper with the larger elements of the crop residue.

24 Claims, 8 Drawing Sheets

U.S. PATENT DOCUMENTS

| | | | | |
|---|---|---|---|---|
| 3,465,507 | A | 9/1969 | Fishaw | 56/294 |
| 3,477,214 | A | 11/1969 | Rogers | 56/295 |
| 3,604,188 | A | 9/1971 | Mott | 56/294 |
| 3,626,456 | A | 12/1971 | Freeborn | 82/12 |
| 3,690,359 | A | 9/1972 | Wenzel et al. | 146/123 |
| 3,693,335 | A | 9/1972 | Mathews | 56/294 |
| 3,786,996 | A | 1/1974 | Richter | 241/46.17 |
| 4,046,488 | A * | 9/1977 | Wickham | 416/210 R |
| 4,292,795 | A | 10/1981 | Linn | 56/503 |
| D262,734 | S * | 1/1982 | Wooden | D23/413 |
| 4,612,941 | A | 9/1986 | Kunde | 130/27 R |
| 4,631,910 | A | 12/1986 | Doyen et al. | 56/505 |
| 4,663,713 | A | 5/1987 | Cornell et al. | 364/424.1 |
| 4,998,679 | A | 3/1991 | Bender | 241/243 |
| 5,042,973 | A | 8/1991 | Hammarstrand | 460/112 |
| 5,180,342 | A | 1/1993 | Van Ee | 474/123 |
| 5,192,245 | A | 3/1993 | Francis et al. | 460/71 |
| 5,205,667 | A | 4/1993 | Montgomery, Sr. | 403/151 |
| 5,232,405 | A | 8/1993 | Redekop et al. | 460/112 |
| 5,272,861 | A | 12/1993 | Roynberg | 56/504 |
| 5,482,508 | A | 1/1996 | Redekop et al. | 460/112 |
| 5,673,545 | A | 10/1997 | Friesen | 56/255 |
| 6,244,026 | B1 | 6/2001 | Minnihan et al. | 56/119 |
| 6,478,674 | B2 | 11/2002 | Redekop | 460/112 |
| 6,497,376 | B2 | 12/2002 | Hammarstrand | 241/243 |
| 6,511,374 | B2 | 1/2003 | Van Ee | 460/112 |
| 6,547,169 | B1 | 4/2003 | Matousek et al. | 239/661 |
| 6,554,701 | B1 | 4/2003 | Wolters | 460/101 |
| 6,572,035 | B1 | 6/2003 | Pfeiffer | 239/650 |
| 6,582,298 | B2 | 6/2003 | Wolters | 460/97 |
| 6,602,131 | B2 | 8/2003 | Wolters | 460/111 |
| 6,616,528 | B2 | 9/2003 | Wolters et al. | 460/111 |
| 6,953,398 | B1 * | 10/2005 | Turner | 460/112 |
| 2004/0259611 | A1 | 12/2004 | Dow | 460/112 |

FOREIGN PATENT DOCUMENTS

| | | |
|---|---|---|
| CA | 2472430 | 12/2004 |
| DE | 2155170 | 5/1973 |
| DE | 2801827 | 7/1978 |
| DE | 3626456 | 11/1987 |
| EP | 0479329 | 4/1992 |
| EP | 1479282 | 11/2004 |
| EP | 1491084 | 12/2004 |
| FR | 1141447 | 9/1957 |
| GB | 216834 | 10/1983 |
| SE | 368657 | 7/1974 |
| WO | 8902215 | 3/1989 |
| WO | 0078126 | 12/2000 |

OTHER PUBLICATIONS

P.D. Rasspe Sohne GmbH & Co. KG photo entitled Rasspe Solingen Le Repute Coutcau Encore Perfectionne Radura Super, no date.

* cited by examiner

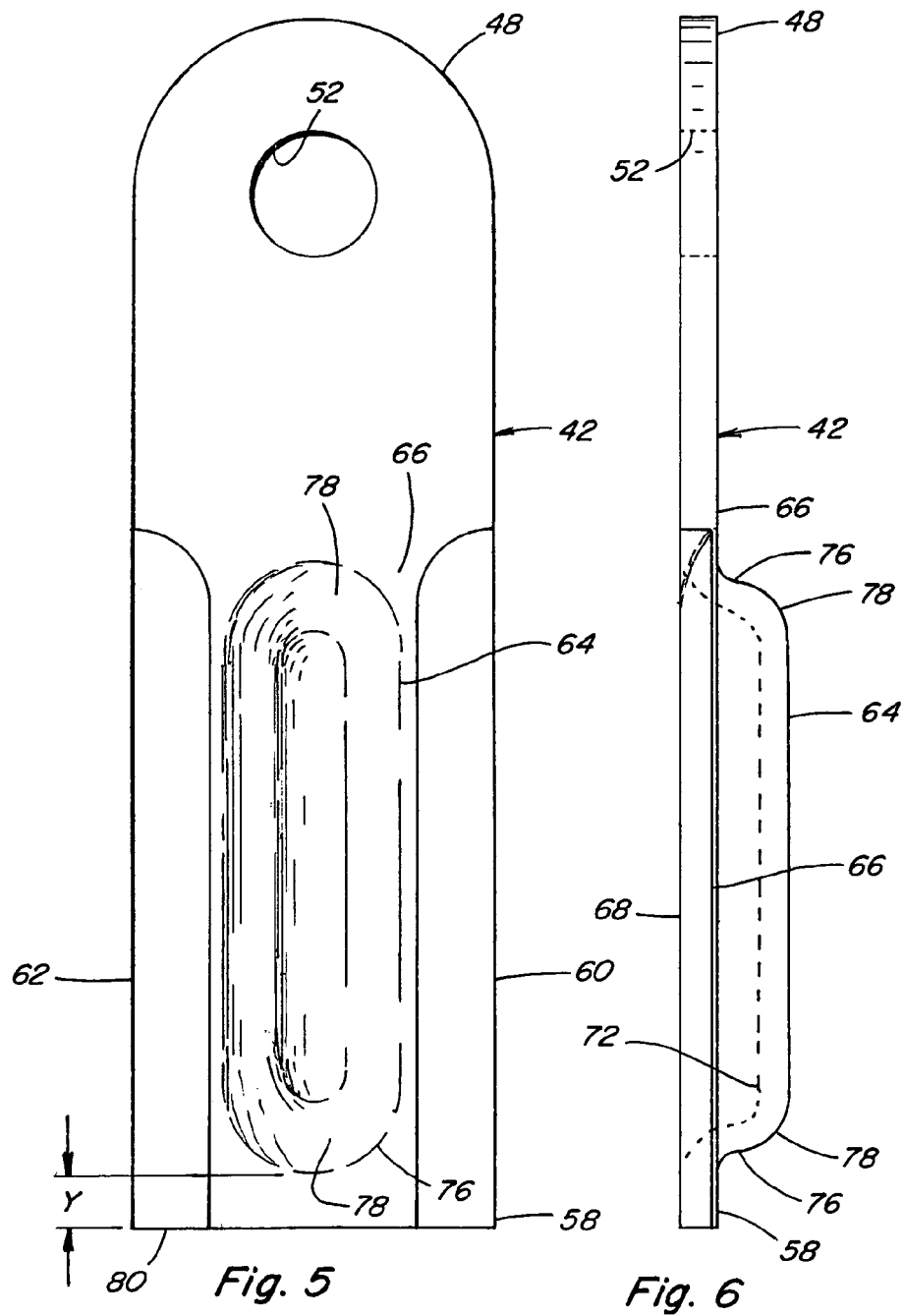
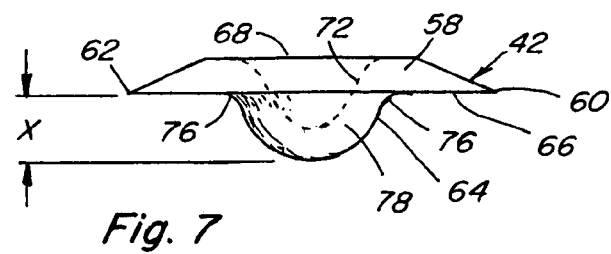
Fig. 5  Fig. 6
Fig. 7

ROTARY CROP RESIDUE CHOPPER APPARATUS WITH STIFFENER HAVING AIR FLOW GENERATING CAPABILITY AND METHOD OF MAKING THE SAME

This application claims the benefit of U.S. Provisional Application No. 60/588,684, filed Jul. 16, 2004.

TECHNICAL FIELD

This invention relates generally to a rotary crop residue chopper for an agricultural combine and a method of making the same, and more particularly to apparatus mountable on a rotatable element of a chopper for chopping crop residue, primarily straw, stalks, and other plant material, received into the chopper from a threshing mechanism of the combine, and for propelling the chopped material outwardly from the combine, which apparatus has at least one integrally formed stiffening element having a capability for generating and/or increasing air flow into, through and from the chopper, the stiffening element being formable by stamping to provide special features, and at least one embodiment of which apparatus can be reversible so as to be mountable in either of two orientations on the rotatable element.

BACKGROUND ART

Threshing and chopping crop residue in an agricultural combine can create substantial amounts of small and lightweight crop residue particles, dust and fragments which are desirably discharged from the combine with the larger chopped crop residue. Apparatus having a straight blade portion for performing the chopping, that is, a substantially planar blade portion oriented in a direction of rotation of the rotatable element on which the apparatus is mounted, has been found to provide excellent chopping capability. Reference in this regard, Gronberg et al. U.S. Pat. No. 3,874,604, and Bender U.S. Pat. No. 4,998,679. However, this orientation provides only minimal air flow generation.

Other apparatus are configured to provide greater air flow generation. Reference in this regard, Redekop et al. U.S. Pat. Nos. 5,232,405; 5,482,508; and 6,478,674; and Hammarstrand U.S. Pat. No. 5,042,973. Of these, the blade member shown in U.S. Pat. No. 5,232,405 includes a support plate supporting a symmetrical transverse blade surface for generating a high velocity of air rotating with the chopping assembly. However, the symmetrical nature of the transverse blade about the support plate can be disadvantageous as it prevents the cutting edge of the blade member from being positioned close to fixed knives of the chopper past which the blade members move to perform the chopping action. The transverse blade is also only disclosed as lying in a plane perpendicular to the support plate and parallel to the rotational axis. And, as a result of the orientation of the blade relative to the support plate, the blade member is not reversible.

The apparatus of U.S. Pat. No. 5,482,508 overcomes the disadvantage of not being able to be positioned close to the fixed knives by having a fan blade extending sidewardly in only one direction from a trailing edge of the blade member. However, as a result of the sideward extent of the fan blade, this blade member is also not reversible and thus different blade members must be provided for use on opposite sides of a fixed knife of a chopper to achieve closeness of the cutting edge of the blade to the knife.

U.S. Pat. No. 6,478,674 is different still as it utilizes a twisted blade design. A disadvantage of this is that the cutting edge is oriented at an angle to the direction of rotation of the blade, which has been found to decrease cutting efficiency.

U.S. Pat. No. 5,042,973 discloses a chopper blade which is bent into a V or arch shape transverse cross section over the entire width of the blade, including the cutting edge or edges thereof, for providing a blower action. An observed disadvantage of the extension of the V or arch shape across the entire extent of the blade member is that it orients the cutting edge at an angle to the direction of rotation, thereby reducing cutting efficiency. Also, this makes the cutting efficiency and blower action inversely related. That is, as the angle of the V or degree of curvature is increased to increase the blower action, the angle of attack of the cutting edge of the blade relative to the direction of rotation thereof will also be increased, thereby decreasing cutting efficiency.

Therefore, what is sought is apparatus for a crop residue chopper which overcomes many of the disadvantages and shortcomings set forth above.

SUMMARY OF THE INVENTION

According to the present invention, a chopper apparatus for a rotary crop residue chopper of an agricultural combine, which overcomes many of the disadvantages and shortcomings set forth above, is disclosed. The chopper apparatus of the invention includes a substantially planar body having side surfaces which are preferably oriented perpendicular to a direction of rotation of the apparatus, such that a leading cutting edge of the apparatus is optimally oriented substantially directly in the direction of rotation for chopping. It is contemplated that the cutting edge can be smooth, serrated, blunt, or any combination of these. The apparatus has at least one longitudinally extending, integral stiffener extending sidewardly from one of the side surfaces for increasing the strength and rigidity of the chopper apparatus and which, during rotation, can generate an air flow for inducting dust and smaller particles of crop residue into the chopper for discharge from the chopper with the larger elements of the chopped crop residue.

According to one preferred aspect of the invention, the body includes opposite longitudinally extending cutting edges and the at least one stiffener is/are symmetrical about a longitudinal center line, so as to allow usage of the apparatus on opposite sides of mounting apparatus of the chopper. Alternatively, the stiffener or stiffeners can be located closer to one of the longitudinal edges. If more than one stiffener is used, for instance, two stiffeners, the stiffeners can be arranged either symmetrically or asymmetrically, the former advantageously providing easy reversibility when desired.

According to still another preferred aspect of the invention, the stiffener is integrally formed on the chopper apparatus by die stamping, casting, molding, forging, striking, hydroforming or another suitable metal forming method. Alternatively, the stiffener can be attached in place on the chopper apparatus by other suitable means, such as by welding. An advantage of the present stiffener portion is that it can be relatively large, and can be located close to a leading or cutting edge of the chopper apparatus, without affecting the angle of attack of the leading or cutting edge. This should be contrasted with and is an important advantage over the chopper blade construction of U.S. Pat. No. 5,042,973 which as noted above is bent into a V or arch shape for providing a blower action, but which resultantly orients the cutting edge at an angle to the direction of rotation, thereby reducing cutting efficiency, which angle is increased by increasing the angle of the V or arch shape.

A special feature of forming the stiffener portion by stamping is that the stamping process can draw material from the adjacent edge or edges of the chopper apparatus to form a concavity or concave region in the edge or edges. This is advantageous as it makes the radial outer end of the cutting edge effectively extend forwardly of the concave region in the direction of rotation which can serve to retain crop material on the edge in opposition centrifugal force from the rotation acting to sling the material radially outwardly. This effective outward extension or prominence of the radial outer portion of the edge also serves to increase the wearability of that portion of the edge, that is, the useful life thereof, as that portion of the edge has been observed to typically wear at a faster rate compared the more radially inward regions of the edge, and also round off.

According to another preferred aspect, the stiffener has a rounded or bulbous shape such that no portion of the surface thereof is oriented perpendicular (e.g. at a 90 degree angle) to the rotational direction. This has been found to provide beneficial stress optimization because the effects of particle erosion are minimized on the stiffener portion. The non-perpendicular stiffener additionally provides improved air flow generation and crop material flow, and less crop material build up in front of the stiffener compared to other known constructions.

The opposite surface of the chopper apparatus preferably has a depression or concavity corresponding in location, and at least generally in shape, to the stiffener portion.

According to still another aspect, the preferred stiffener does not extend to the radial outer longitudinal end of the chopper apparatus, but instead terminates a distance therefrom sufficient such that if all or a substantial portion of the stiffener wears or abrades away as a result of contact with abrasive crop material and dust, the radial outer leading and trailing edges of the chopper apparatus will remain connected together to maintain the structural integrity and functionality of the chopper apparatus.

If more than one stiffener is used, for instance, two stiffeners are used, the stiffeners can be located all or completely on opposite sides of the longitudinal centerline of the chopper apparatus. The stiffeners can also be offset longitudinally. That is, all or a portion of one stiffener can lie on one side of a longitudinal centerline of the chopper apparatus and all or a portion of the other stiffener can lie on the opposite side of the centerline, and the stiffeners can be located at different or the same longitudinal positions along the chopper apparatus, which longitudinal positions can, for instance, partially coincide or overlap. One or more of the stiffeners can also have a curve shape in the radial direction, and/or can be oriented at an angle to the radial direction, as desired or required for providing a particular or sought after capability or capabilities.

BRIEF DESCRIPTION OF THE DRAWINGS

FIG. 5 is an enlarged side view of a representative chopper apparatus of the invention;

FIG. 6 is an enlarged end view of the representative chopper apparatus of FIG. 5;

FIG. 7 is an enlarged longitudinal end view of the chopper apparatus of FIG. 5;

DETAILED DESCRIPTION OF THE INVENTION

Figure 1:
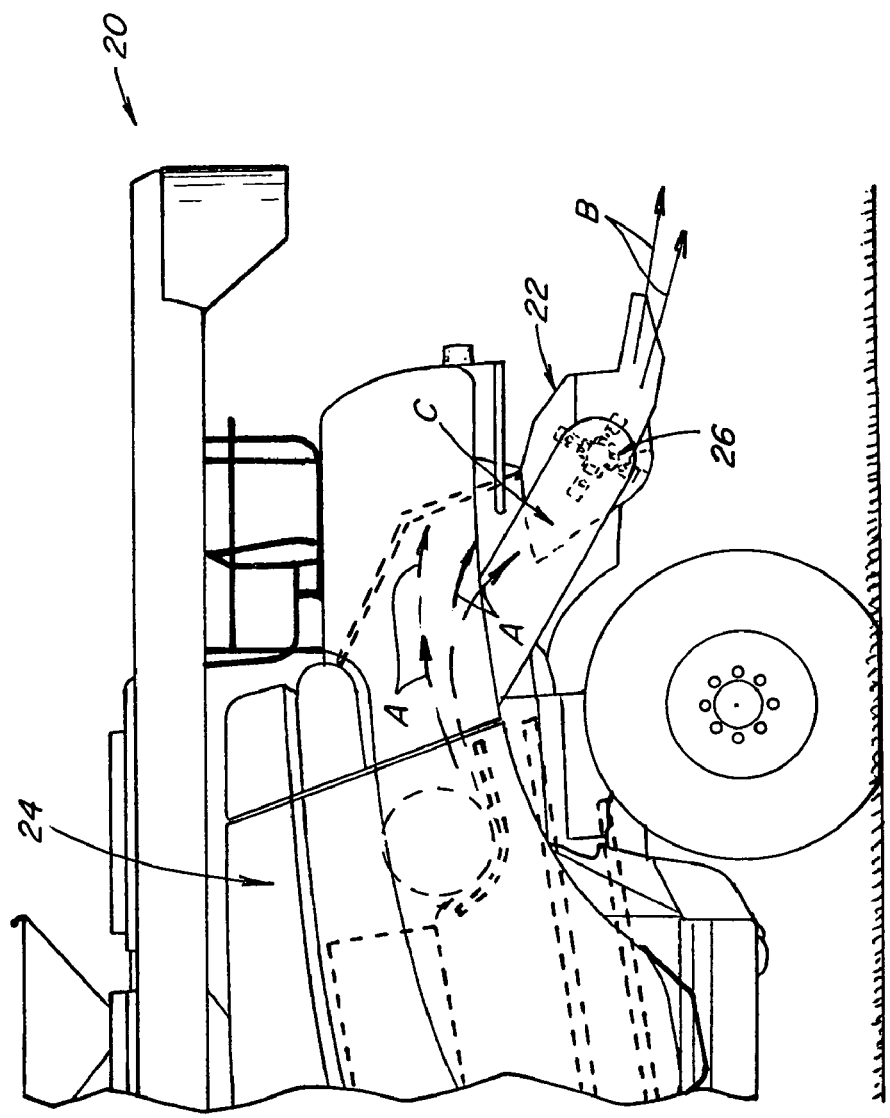
FIG. 1 is a fragmentary, simplified side elevational representation of an agricultural combine having a crop residue chopper including chopper apparatus according to the present invention.

Referring now to the drawings, wherein preferred embodiments of the present invention are shown, in FIG. 1, a typical prior art self-propelled agricultural combine 20 is shown, including a rotary crop residue chopper 22 constructed and operable for receiving a flow of straw and other crop residue from a rotary threshing mechanism 24 of combine 20, as denoted by arrows A, and chopping and cutting the straw and other residue and propelling it outwardly from combine 20, as denoted by arrows B, by rotation of a rotatable element or rotor 26 of chopper 22, as denoted by arrow C.

Figure 2:
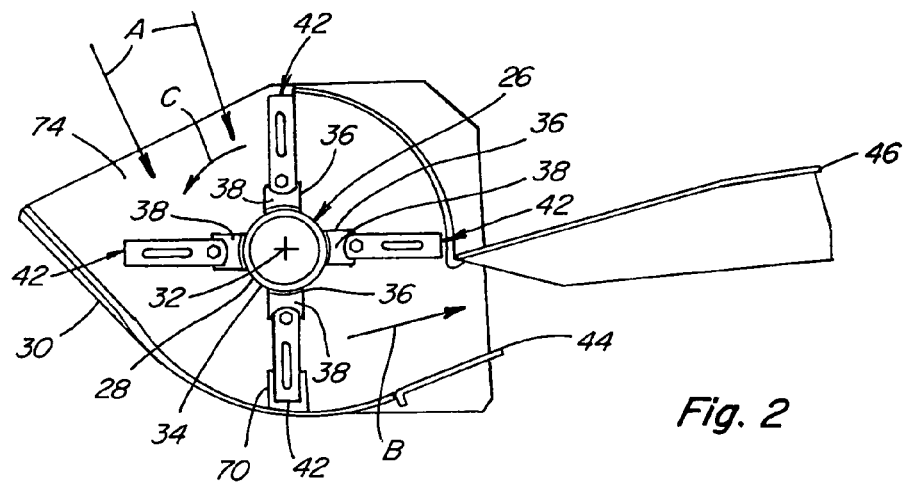
FIG. 2 is an enlarged side elevational representation of the chopper of FIG. 1 including the chopper apparatus of the invention in association with one fixed knife arrangement for the chopper.

Referring also to FIG. 2 wherein rotor 26 and chopper 22 are better shown, rotor 26 includes an elongate cylinder 28 supported within a housing 30 of chopper 22 for rotation in rotational direction C about a rotational axis 32 extending longitudinally through rotor 26. Rotor 26 can be suitably supported for such rotation by bushings, bearings, or the like, and is rotatable using any suitable rotatable power source, including, but not limited to, a belt or shaft drive connected to an engine of combine 20, a fluid motor, or the like (not shown), in the well known conventional manner. Cylinder 28 includes an outer cylindrical surface 34 having a plurality of mounting brackets 36 mounted thereon at angularly spaced locations therearound.

Figures 3, 4:
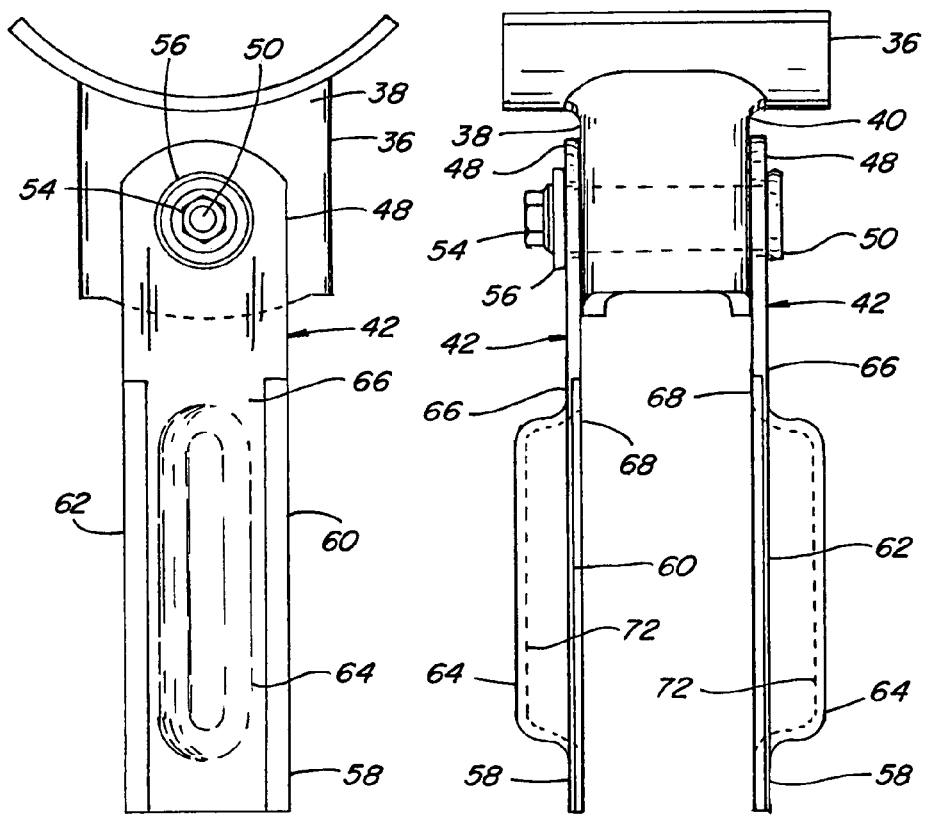
FIG. 3 is an enlarged side view of a mounting bracket of the chopper including a chopper apparatus of the invention depending downwardly therefrom.
FIG. 4 is an enlarged end view of the mounting bracket showing one mounting arrangement including a pair of chopper apparatus of the invention depending downwardly therefrom.

Referring also to FIGS. 3 and 4, each bracket 36 includes a pair of oppositely facing axial sides 38 and 40, and supports chopper apparatus 42 constructed and operable according to the present invention adjacent to each side 38 and 40, for chopping crop residue flow A and propelling it from chopper 22 as denoted by arrow B. Here, it should be noted that chopper 22 includes discharge guides 44 and 46 which can be movable and adjustable for changing the direction and other characteristics of the discharged chopped crop residue, as desired.

Chopper apparatus 42 are shown pivotally mounted in pairs adjacent to oppositely facing sides 38 or 40 of each bracket 36, respectively, so as to extend radially outwardly therefrom in spaced, opposed relation as shown. Each apparatus 42 is an elongate member and includes a mounting end portion 48 which is preferably pivotally mounted to bracket 36 by a bolt 50 which passes through a hole 52 through each mounting end portion 48 (FIGS. 5 and 6) and a hole (not shown) through bracket 36, and which is secured in place by a nut 54. One or more washers or bushings 56 can be disposed between the apparatus 42 and the head of bolt 50 and/or nut 54 to facilitate free pivotal movement of the apparatus 42 in the direction of rotation C in a well known flail action or movement.

Referring also to FIGS. 5, 6 and 7, each apparatus 42 includes a free end portion 58 opposite mounting end portion 48. Free end portion 58 includes at least one, and preferably two, opposite, longitudinally extending edges 60 and 62 which are oriented in direction of rotation C, and one or both of which can be sharpened, such that the leading one of edges 60 and 62 relative to rotational direction C can cut or chop crop residue contacted thereby during the rotation thereof, in the well known manner. Here, it should be noted that while cutting edges 60 and 62 are illustrated as being smooth, it is contemplated that edges 60 and 62 could also be serrated, blunt, or any combination of these, as desired or required for a particular application. In addition, and importantly, free end portions 58 of each chopper apparatus 42 includes an elongate stiffener portion 64 that extends longitudinally and protrudes sidewardly from a side surface 66 of the chopper apparatus oriented parallel to direction of rotation C, for structurally stiffening apparatus 48. Stiffener portion 64 can also generate an air flow in the rotational direction C during the rotation, preferably sufficient for inducting dust and smaller particles of crop residue into chopper 22 for discharge with the larger elements of the crop residue.

Stiffener portion 64 is located on side surface 66 substantially equidistant from edges 60 and 62, such that each chopper apparatus 42 is reversible, that is, it can be mounted either side 38 or 40 of a mounting bracket 36. Stiffener portion 64 can have any desired longitudinal and/or sideward extent, as required or desired for providing a desired or required stiffness, and/or generating particular air flow characteristics, such as, but not limited to, more or less induction in the inlet region of chopper 22.

Because stiffener portion 64 extends sidewardly from only one side surface 66 of free end portion 58, an opposite side surface 68 of chopper apparatus 42 can be positioned so as to pass in closely spaced relation to a fixed knife such as representative fixed knife 70 (FIG. 2) shown mounted in housing 30 of chopper 22 along the path of movement of chopper apparatus 42.

Each chopper apparatus 42 including stiffener portion 64 is preferably, bot not necessarily of unitary construction, side surfaces 66 and 68 preferably being substantially planar. Stiffener portions 64 can be formed by a suitable metal forming method such as by die stamping, casting, molding, forging, striking, hydroforming, or the like, or can be attached in place on the chopper apparatus, for example, by welding. Particularly if die stamped, forged, or hydroformed, stiffener portion 64 can include a concavity 72 in side surface 68, corresponding generally in shape but smaller in extent compared to the protuberance of stiffener 64 on surface 66, as illustrated.

As an example dimensionally, for a chopper apparatus such as apparatus 42 having an overall length of from about 130 to 250 millimeters (mm) and a width of from about 30 to 80 mm, a suitable stiffener portion 64 can have a length of from about 130 to 235 mm, a width of from about 30 to 80 millimeters, (smaller values for smaller width chopper apparatus), and a sideward extent from side surface 66 of from about 0.0 to 20 mm as represented by distance X (FIG. 7), so as to be sufficient such that stiffener portion 64 will desirably disturb air flow over surface 66 as chopper apparatus 42 is rotated, so as to generate induction in an inlet region 74 of chopper 22 (FIG. 2), for supplementing crop residue flow A by drawing dust and other lighter airborne particulate matter around inlet region 74 into and through housing 30. This is particularly useful for reducing and evacuating dust in the rear end of combine 20. It should be appreciated that the above ranges are only exemplary and that additional ranges, both of lesser and greater values, could be implemented.

Stiffener portion 64 preferably has rounded portions 76 (FIGS. 5, 6 and 7) at its interface with surface 66; rounded end portions 78 at its radial inner and outer ends; and an overall rounded sectional shape when viewed from a longitudinal end (FIG. 7), such that all portions of the surface of stiffener portions 64 facing the direction of rotation are oriented at less than a 90 degree angle to side surface 66. In turn, no imaginary line lying in a surface of any of rounded portions 76 and 78 would lie substantially parallel to the rotational axis 32, which extends longitudinally through rotor 26 (see FIGS. 2, 10 and 11). Advantages of such rounded shape include good air flow generation and air flow characteristics over stiffener 64. This rounded shape can also optimize stress upon stiffener portion 64 and reduce wear of stiffener portion 64 as a result of passage through and contact with crop material and dust at high rotational speeds, and it reduces areas where snagging and collecting of crop material can occur. In short, the rounded shape of stiffener portion 64 minimizes the effects of particle erosion on stiffener portion 64.

It has also been found that as a result of the protrusion of stiffener portion 64 into the flow of crop material, dust and air, stiffener portion 64 can be subject to greater or accelerated wear compared to other regions of chopper apparatus 42. As a result, to facilitate adequate service life, stiffener portion 64 preferably terminates a spaced distance Y (FIG. 5) preferably with a range of from about 5 to 7 mm from a longitudinal endmost edge portion 80 of free end portion 58 of the example chopper apparatus 42 having dimensions set forth above, such that in the event stiffener portion 64 wears through to produce a hole through chopper apparatus 42, endmost edge portion 80 will remain continuous between edges 60 and 62, thereby maintaining the flatness and integrity and functionality of free end portion 58, even as the leading edge 60 or 62 itself wears. It should be appreciated that the above ranges are only exemplary and that additional ranges, both of lesser and greater values, could be implemented.

Referring also to FIGS. 8, 8A, 8B and 9, three alternative chopper apparatus 82, 82A and 82B, constructed and operable according to the teachings of the present invention, are illustrated, like parts of chopper apparatus 82, 82A and 82B, and chopper apparatus 42 being identified by like numbers.

Each of chopper apparatus 82, 82A and 82B differs from chopper apparatus 42 primarily in two respects. First, only one longitudinally extending edge, here edge 60, which would be the leading or cutting edge, is shown sharpened, which would provide a manufacturing cost advantage, but would limit or eliminate reversibility if it is desired or required to use the sharpened edge as the cutting or leading edge. As a result, a chopper apparatus that is a mirror image of the chopper apparatus 82, 82A or 82B, that is, one with a sharpened edge 62 instead of edge 60, or another chopper apparatus, such as a chopper apparatus 42, would be usually be required for mounting on an opposite side of a mounting member, such as bracket 36. Second, elongate stiffener portion 64, 64A and 64B is offset toward either edge 60 or edge 62, relative to a longitudinal center line 92.

Figure 8:
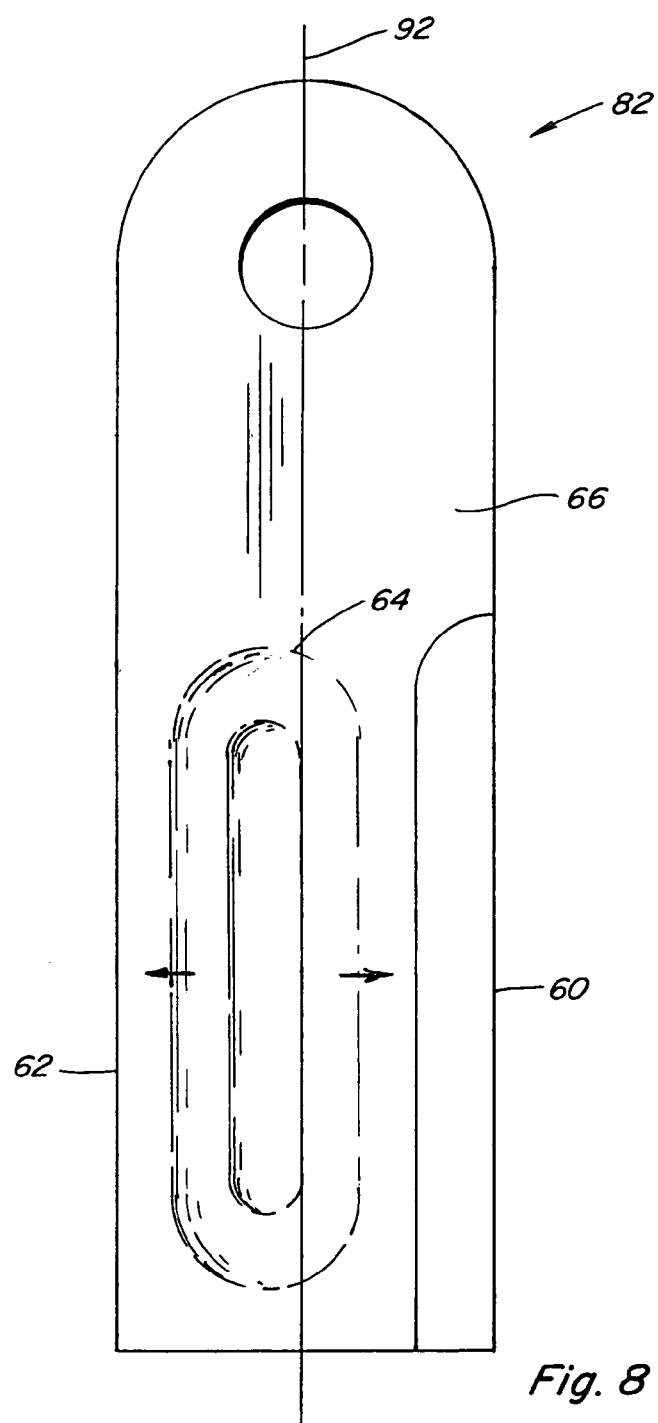
FIG. 8 is an enlarged side view of another representative chopper apparatus of the invention.
Figure 9:
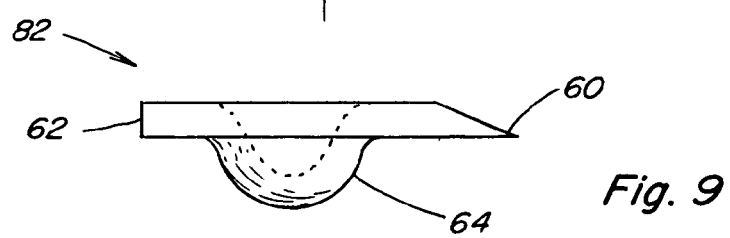
FIG. 9 is an enlarged longitudinal end view of the chopper apparatus of FIG. 8.

Referring more particularly to FIGS. 8 and 9, the elimination of the sharpened trailing edge 62 provides the advantage of chopper apparatus 82 having more thickness in the vicinity of that edge so as to be itself stiffer. The elimination of the second sharpened edge provides a larger area for stiffener portion, such that it can be correspondingly larger, as denoted by the arrows, and/or have a curved or angled shape and/or orientation, and/or allows it to be placed at a greater variety of side to side locations, for achieving desired or required stiffness and/or air flow generating capability. For stamped versions of the chopper apparatus, this can also provide an additional area from which to draw material for forming the stiffener portion, without resultant thinning or deforming of the chopper apparatus.

Here, its should be observed that stiffener portion 64 of chopper apparatus 82 is relatively large so as to extend over a larger area of side surface 66, including over longitudinal center line 92, whereas the stiffener portions 64A and 64B of apparatus 82A and 82B, respectively, are shown lying completely on one side or the other of the longitudinal center line 92 of each of those chopper apparatus. An advantage of this latter location is that mirror image stampings, for example for use on opposite sides of a mounting bracket 36 (see FIG. 4) can be made using the same die, for a manufacturing cost advantage. As another advantage for some applications wherein the chopper apparatus 82A or 82B is stamped, stiffener portions 64A and 64B can be located sufficiently close to edge 60 or 62, and/or can have a sufficiently large size in at least one direction, such that material will be drawn from the adjacent edge 62 or 64 so as to form a concavity or concave region 60A or 62A in the respective edge 60 or 62 when the stiffener portion 64A or 64B is formed. This is an inherent qualitative feature of the stamping process. A stiffener portion 64A or 64B formed in this manner and as illustrated will stiffen and support the adjacent edge during the cutting and chopping action, and provide a desired degree of air flow generating capability. A concave region 60A or 62A in the leading one of edges 60 or 62 will also be advantageous for some applications, as the greater sideward extent of a radial outermost region 60B or 62B of respective edge 60 or 62 radially outwardly of the concave region 60A or 62A can act to retain crop material on the edge longer in opposition to centrifugal forces acting on the crop material during rotational movement of the chopper apparatus about rotational axis 32 (FIG. 2), at least until the radial outer portion 60B or 62B wears down from use. In this latter regard, it has been observed that the radial outermost portion of the leading or cutting edge will be subject to faster wear and, as a result, the corner thereof will typically round off. Another advantage of the greater sideward extent of radial outer portion 60B or 62B relative to the adjacent concave region 60A or 62A, is that the radial outermost portion of edge 60 has a greater transverse extent or is more prominent (perpendicular to center line 92 and forwardly in the direction of rotation) compared to the concave portion, such that the radial outer portion will provide improved wearability during use.

Stiffener portion 64B of chopper apparatus 82B located on the side of center line 92 closer to edge 62, which is the trailing or non-cutting edge, will provide stiffening and air flow generating capabilities, but from a location farther away from the leading cutting edge 60, which may be more desirable for some applications.

Here, it should be observed that FIG. 9 is an end view of chopper apparatus 82 of FIG. 8, and that end views of chopper apparatus 82A and 82B would be similar, differing only in the location of stiffener portion 64A or 64B relative to edges 60 and 62.

It should also be observed from FIGS. 8, 8A, 8B and 9 that a wide variety of sizes of stiffener portions can be used in accordance with the present invention. As an example dimensionally, for a chopper apparatus such as apparatus 82 having an overall length of from about 130 to 250 millimeters (mm) and a width of from about 30 to 80 mm, a suitable stiffener portion 64 can have a length of from about 130 to 235 mm, a width of from about 30 to 80 millimeters, (smaller values for smaller width chopper apparatus), and a sideward extent from side surface 66 of from about 0.0 to 20 mm as represented by distance X (FIG. 7), so as to be sufficient such that stiffener portion 64 will desirably disturb air flow over surface 66 as chopper apparatus 42 is rotated, so as to generate induction in an inlet region 74 of chopper 22 (FIG. 2), for supplementing crop residue flow A by drawing dust and other lighter airborne particulate matter around inlet region 74 into and through housing 30. This is particularly useful for reducing and evacuating dust in the rear end of combine 20. Stiffener apparatus 64A and 64B can have similar length dimensions, but should be smaller in width than stiffener portion 64 if it is desired to be limited to one side of center line 92. The distance of the radial outer end of the stiffener portions 64A and 64B from free end 58 is preferably within the range set forth above (distance Y in FIG. 5). It should also be noted that the greater the width and/or sideward extent of stiffener portions 64A and 64B, and/or the closer to adjacent edge 60 or 62, the more material that will be drawn from the vicinity of that adjacent edge during the stamping process, such that the concavity or depth of the concave region 60A or 62A from the forwardmost portion of the edge in the direction of rotation (e.g. radial outer portion 60B) can be resultantly increased, and the radial outer portion 60B or 62B made correspondingly more prominent. Conversely, the lesser the width and/or sideward extent of stiffener portions 64A and 64B, and/or the farther from adjacent edge 60 or 62, the less material that will be drawn from the vicinity of that adjacent edge, such that the concavity or depth of the concave region 60A or 62A can be resultantly decreased, and the radial outer portion 60B or 62B made correspondingly less prominent. Here, it should be noted such different shapes and sizes can be formed without affecting the angular orientation of the edge 60 or 62 relative to the direction of rotation, such as is a problem with prior constructions involving bending.

It should be appreciated that the above ranges are only exemplary and that additional ranges, both of lesser and greater values, could be implemented.

Figures 8A, 8B:
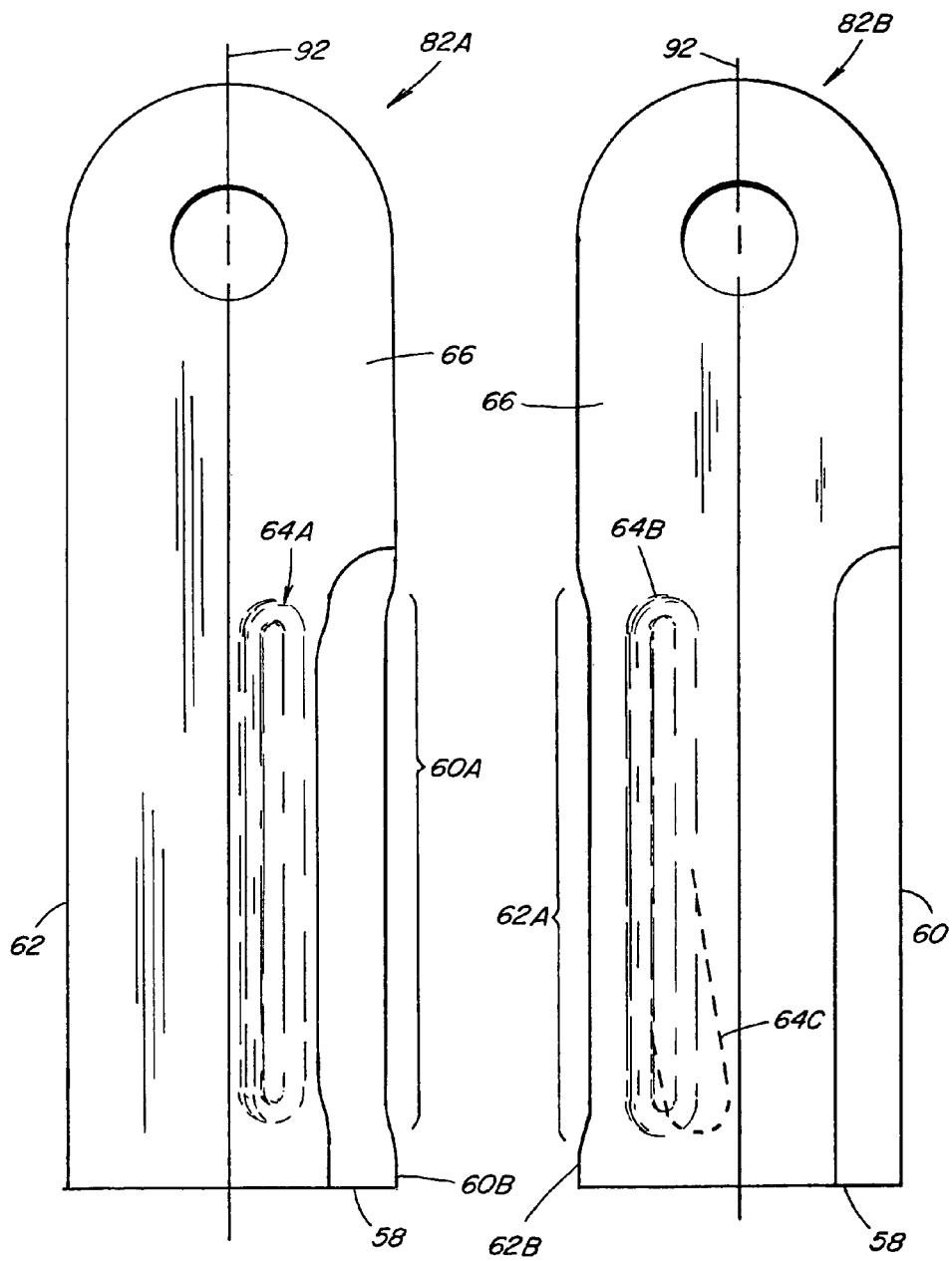
FIG. 8A is an enlarged side view of another representative chopper apparatus of the invention.
FIG. 8B is an enlarged side view of another representative chopper apparatus of the invention.

With regard to the shape of the stiffener portions 64, 64A and 64B, it should be noted that they can have a wide variety of alternative shapes, such as, but not limited to, an angular shape 64C as illustrated in FIG. 8B which extends forwardly in the direction of rotation, for providing desired stiffening and/or air flow generating capabilities.

Figure 10:
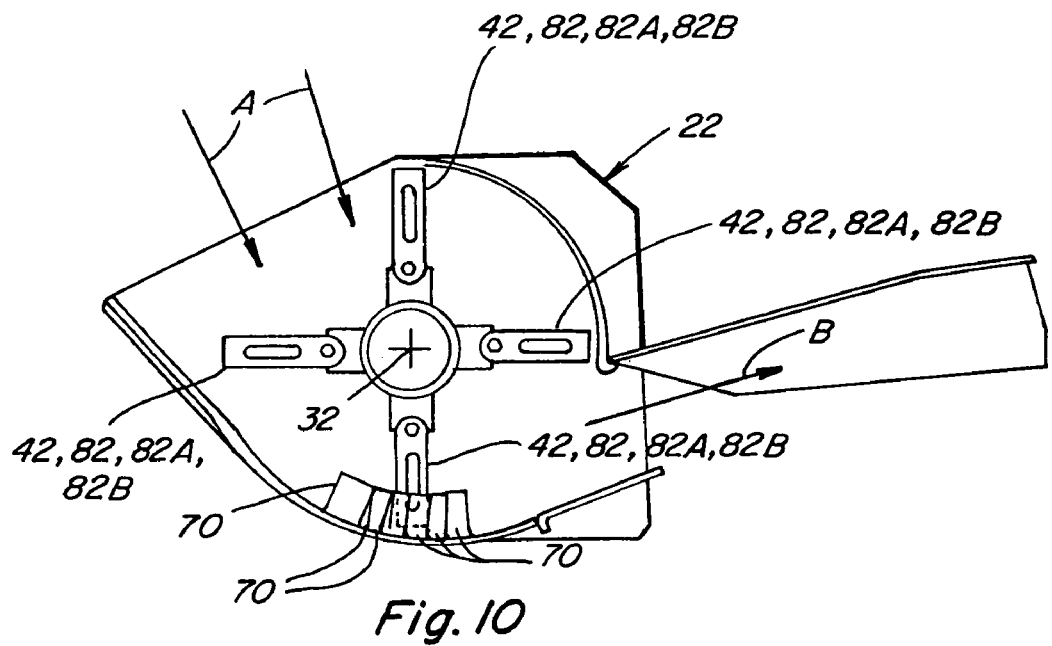
FIG. 10 is another enlarged side elevational representation of the chopper of FIG. 1 including the chopper apparatus of the invention, in association with another fixed knife arrangement.

FIG. 10 shows crop residue chopper 22 including a plurality of fixed knives 70 arranged in an array which is offset relative to rotational axis 32 of cylinder 28, such that adjacent ones of chopper apparatus 42, 82, 82A, 82B, or any of the other chopper apparatus disclosed hereinafter will interact with knives 70 at different angular locations about axis 32. As a result, crop material inducted into chopper 22 and chopped by the interaction of chopper apparatus 42, 82 82A, 82B and knives 70, may be discharged from chopper 22, as denoted by arrow B, in different directions along axis 32.

Figure 11:
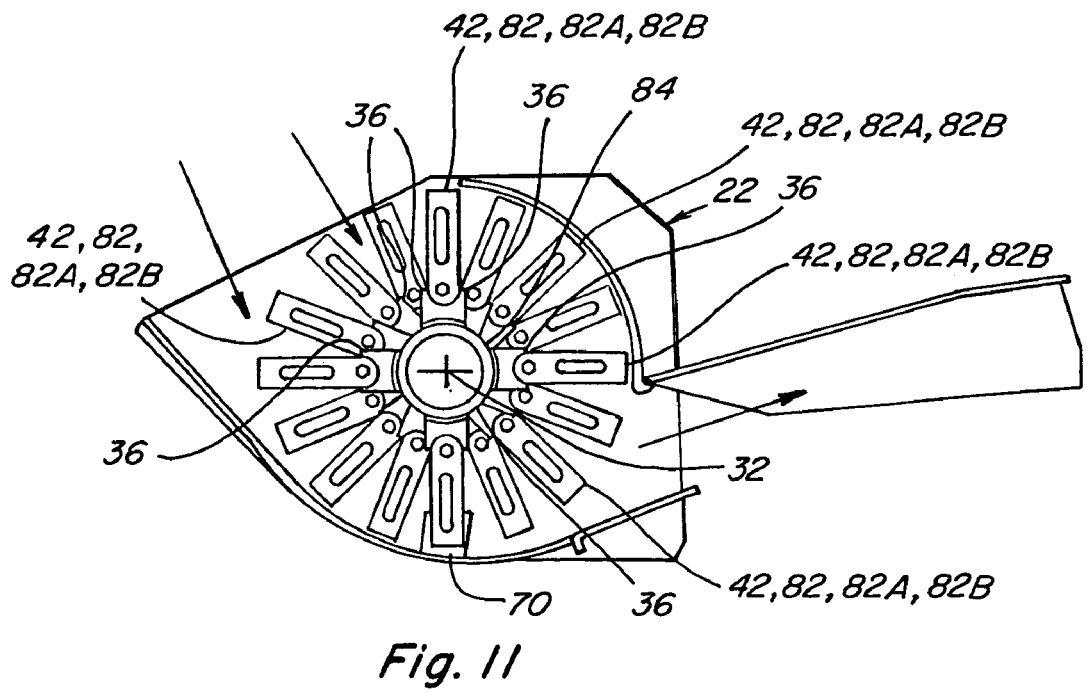
FIG. 11 is still another enlarged side elevational representation of the chopper of FIG. 1 showing an alternative arrangement of the chopper apparatus of the invention.

In FIG. 11, chopper 22 is shown including a rotor 84 having mounting brackets 36 disposed at angularly offset positions about a rotational axis 32 of the rotor. A representative fixed knife 70 is shown, it being contemplated that a single axially extending rank of knives 70 can be used, or axially offset knives, as depicted in FIG. 10.

Figure 12:
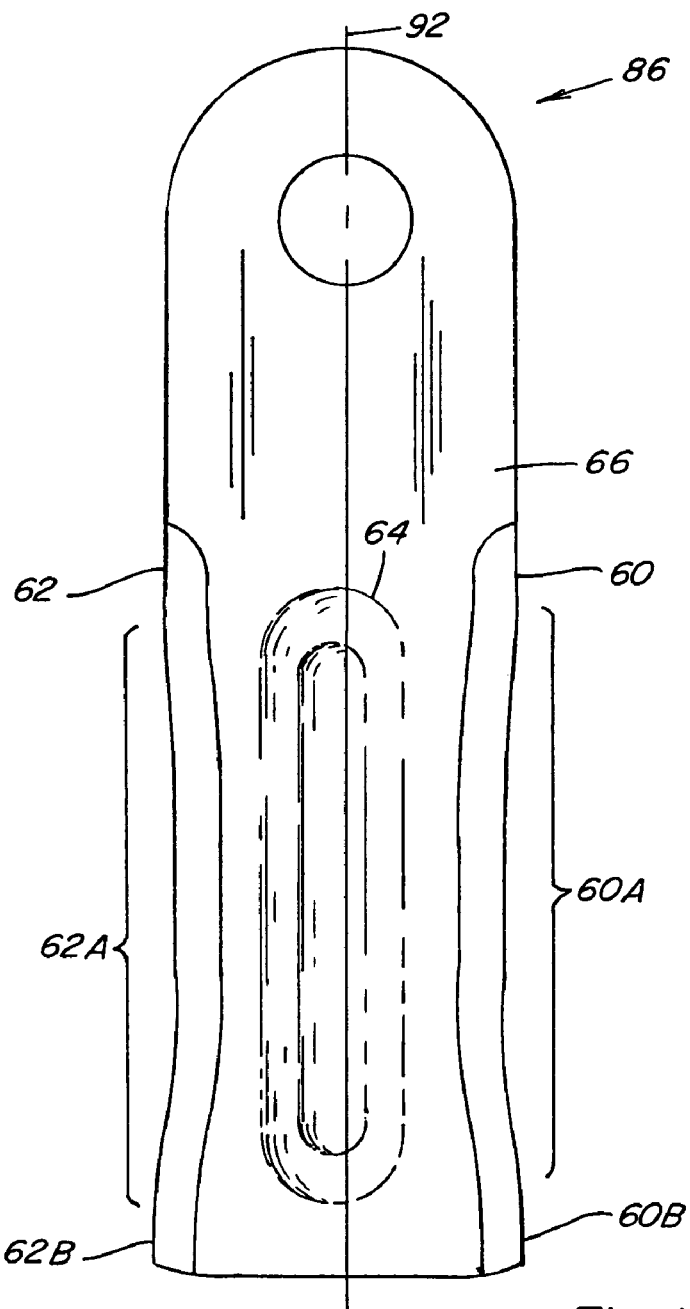
FIG. 12 is an enlarged side view of another chopper apparatus of the invention.
Figure 13:
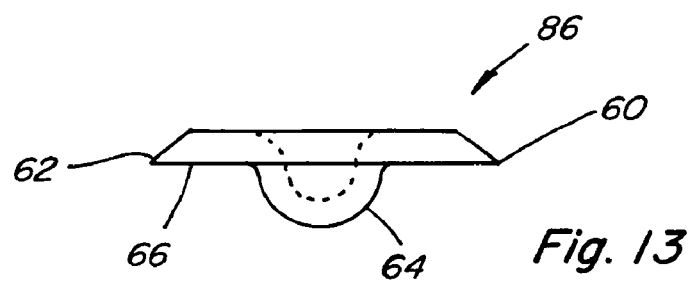
FIG. 13 is an enlarged longitudinal end view of the chopper apparatus of FIG. 12.

Referring also to FIGS. 12 and 13, another alternative chopper apparatus 86 constructed and operable according to the teachings of the present invention is shown, like parts of chopper apparatus 86 and chopper apparatus 42, 82, 82A and 82B being identified by like numbers. Chopper apparatus 86 is most similar to chopper apparatus 42 in that it includes a single centered stiffener portion 64 in essentially the same location protruding sidewardly from side surface 66 as stiffener portion 64 of chopper apparatus 42. Here though, stiffener portion 64 is formed in chopper apparatus 86 by stamping in such a manner that concave regions 60A and 62A are formed in edges 60 and 62, respectively, similar as in chopper apparatus 82A and 82B. Again, this is an inherent qualitative feature of the stamping process. Also again, such concavity in the leading one of edges 60 or 62 has been found to be advantageous, for retaining the crop material on the edge in opposition to centrifugal forces acting on the crop material during rotational movement of the chopper apparatus about rotational axis 32 (FIG. 2), at least until the edge wears down from use. In this latter regard, it has been observed that the radial outermost portion of the leading cutting edge will be subject to faster wear and, as a result, will typically round off. As result of the concavity, the radial outermost portions 60B and 62B of edges 60 and 62 have a greater transverse extent (perpendicular to center line 92) than the concave regions, such that the radial outer portion 60B will have improved wearability during use.

Figure 14:
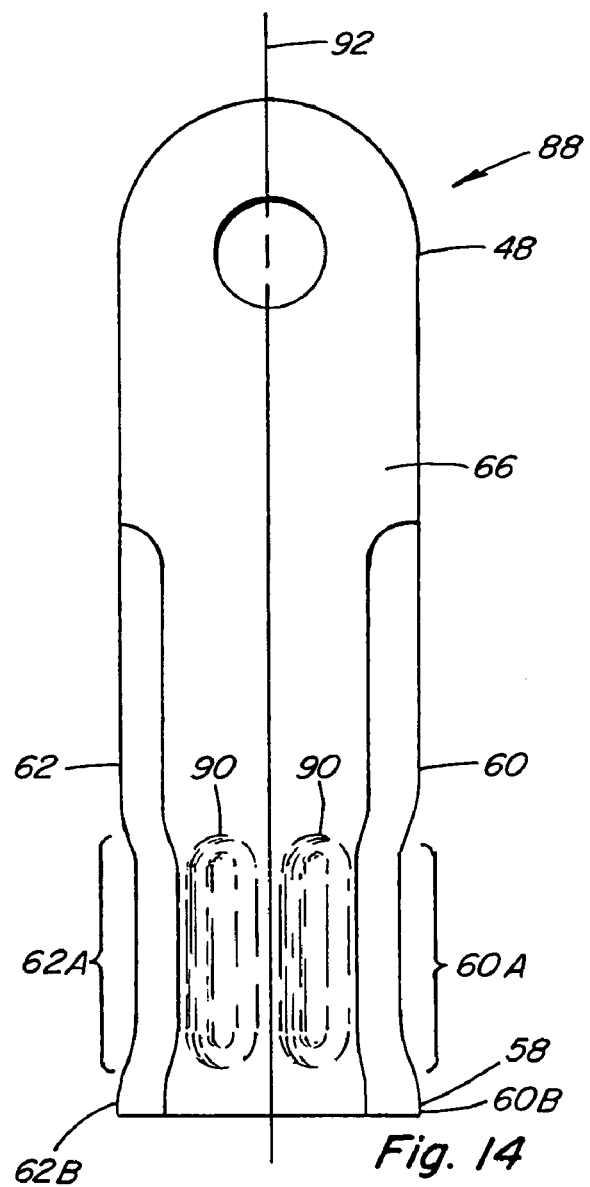
FIG. 14 is an enlarged side view of another chopper apparatus of the invention.
Figure 15:
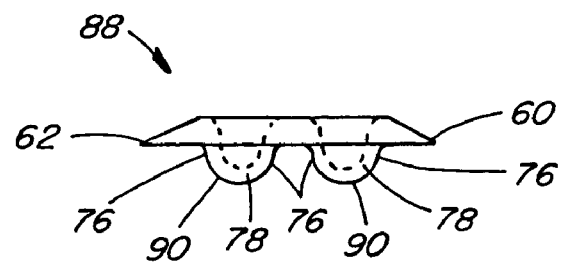
FIG. 15 is an enlarged longitudinal end view of the chopper apparatus of FIG. 14.

Referring also to FIGS. 14 and 15, still another alternative chopper apparatus 88 constructed and operable according to the teachings of the present invention is shown, like parts of chopper apparatus 88 and chopper apparatus 42, 82, 82A, 82B and 86 being identified by like numbers. Chopper apparatus 88 has a planar side surface 66 having opposite longitudinal edges 60 and 62 oriented to face directly in the direction of rotation, one or both of which can be sharpened, in the latter instance to provide reversibility, if desired. Chopper apparatus 88 differs from the previous chopper apparatus in the provision of two smaller stiffener portions 90 extending sidewardly from side surface 66, on opposite sides of longitudinal center line 92 of chopper apparatus 88. Stiffener portions 90 are located at the same longitudinal position along center line 92 between mounting end portion 48 and free end portion 58, although it is contemplated that they could be longitudinally offset. Stiffener portions 90 are preferably spaced adequately from free end portion 58, for instance, within the range set forth above, such that in the event of wear through of the stiffener portion, the integrity of free end portion 58 will be maintained. It is also preferable that stiffener portions 90 each be at least largely longitudinally continuous, such that little or no longitudinal gap is present therebetween. This is to provide adequate stiffness along the length of chopper apparatus 88, and also to provide desired air flow generation and induction properties. Other aspects of stiffener portions 90, such as longitudinal and/or sideward extent, can be as required or desired for the desired or required stiffness and/or air flow characteristics.

Again, similarly to stiffener portions 64 of chopper apparatus 86 and stiffener portions 64A and 64B of chopper apparatus 82A and 82B discussed above, stiffener portions 90 are preferably formed in chopper apparatus 86 by stamping in such a manner that concave regions 60A and 62A are formed in edges 60 and 62, respectively. This is an inherent qualitative feature of the stamping process. Also again, such concavity in the leading one of edges 60 or 62 has been found to be advantageous, for retaining the crop material on the edge in opposition to centrifugal forces acting on the crop material during rotational movement of the chopper apparatus about rotational axis 32 (FIG. 2), at least until the edge wears down from use. In this latter regard, it has been observed that the radial outermost portion of the leading cutting edge will be subject to faster wear and, as a result, will typically round off. As result of the concavity, the radial outermost portions 60B and 62B of edges 60 and 62 have a greater transverse extent (perpendicular to center line 92) than the concave regions, such that the radial outer portion 60B will have improved wearability during use.

Dimensionally, for an exemplary chopper apparatus 88 having an overall length of from about 130 to 250 millimeters (mm) and a width of from about 30 to 80 mm, a suitable stiffener portion 90 can have a length of from about 130 to 235 mm, a width of from about 15 to 40 millimeters, (smaller values for smaller width chopper apparatus), and a sideward extent from side surface 66 of from about 0.0 to 20 mm as represented by distance X (FIG. 15), so as to be sufficient such that stiffener portion 90 will desirably disturb air flow over surface 66 as chopper apparatus 88 is rotated, so as to generate induction in an inlet region 74 of chopper 22 (FIG. 2), for supplementing crop residue flow A by drawing dust and other lighter airborne particulate matter around inlet region 74 into and through housing 30. Again, it should be appreciated that the above ranges are exemplary only and that additional ranges, both of lesser and greater values, could be implemented.

Also, it is desirable for stiffener portions 90 to have rounded portions 76 at their interface with surface 66; rounded end portions 78 at their radial inner and outer ends; and an overall rounded sectional shape when viewed from a longitudinal end (FIG. 15) such that all portions of the surface of stiffener portions 90 facing the direction of rotation are oriented at less than a 90° angle to side surface 66. Again, advantages of such rounded shape include good air flow generation and air flow characteristics over stiffeners 90. This rounded shape can also reduce wear of the stiffener portions as a result of passage through and contact with crop material and dust at high rotational speeds, and it reduces areas where snagging and collecting of crop material can occur.

Here, although chopper apparatus 88 is shown including two stiffener portions, other arrangements of multiple stiffener portions are contemplated, such as arrangements including three or more stiffeners of the same or different shapes and/or sizes, and ones which can be longitudinally coextensive, or offset to a desired extent. It should also be observed that edges 60 and 62 are each shown as being sharpened, and include concave regions 60A and 62A, respectively, adjacent to the respective stiffener portions 90, as a result of the stamping process as explained above. Again, such concave regions can facilitate retention of crop material on the leading one of edges 60 and 62 in opposition to centrifugal forces acting thereon during rotation. The greater sideward extent of the radial outermost portion 60B of the leading cutting edge 60 also provides improved wearability as also explained above.

Here, it should additionally be noted that it is contemplated that although stiffener portions 64, 64A, 64B and 90 shown in the drawings and disclosed hereinabove are each oriented so as to extend in the longitudinal direction, any of the stiffener portions can be oriented at an angle to the longitudinal axis of the chopper apparatus, as desired or required for achieving a particular air flow generation or stiffening characteristic or characteristics.

Addressing methods of manufacture of any of the above discussed chopper apparatus so as to have concave regions 60A and/or 60B on respective edges 60 and 62, such features are preferably formed as discussed above as a result of stamping stiffener portions 54, 64A, 64B, 64C or 90 into the chopper apparatus 42, 82, 82A, 82B, 86 or 88. Alternatively, such features can be formed all or in part by grinding.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A crop residue chopper for an agricultural combine, comprising:
    a chopper housing supported adjacent to a rear opening or the combine, the chopper housing including an inlet opening positioned for receiving a flow of crop residue from a threshing mechanism of the combine, and a discharge opening;
    a rotor supported in the housing between the inlet and discharge openings for rotation in a rotational direction about a rotational axis; and
    a plurality of elongate chopper knives disposed at angularly spaced locations around the rotor, respectively, each of the knives including a mounting end portion pivotally mounted to the rotor for pivotal movement in the rotational direction, a free end portion opposite the mounting end portion, a longitudinally extending edge facing in the rotational direction adjacent to the free end portion, and a side surface extending longitudinally between the free end portion and the mounting end portion and facing sidewardly relative to the rotational direction, the side surface including at least one elongate bulbous shaped stiffener portion extending sidewardly therefrom for generating an air flow through the inlet opening into the chopper housing when the rotor is rotated in the rotational direction therein, wherein the stiffener portion terminates at a spaced distance from an endmost edge portion of the free end portion.

2. The crop residue chopper of claim 1, wherein the longitudinally extending edge of each of the chopper knives includes a sharpened leading edge portion, and the at least one stiffener portion is about longitudinally coextensive with the sharpened leading edge portion.

3. The crop residue chopper of claim 1, wherein the longitudinally extending edge of each of the chopper knives includes a longitudinally extending concave region and the at least one stiffener portion is about longitudinally coextensive with the concave region.

4. The crop residue chopper of claim 1, comprising two of the stiffener portions extending in generally parallel relation one to the other.

5. The crop residue chopper of claim 1, wherein the at least one stiffener portion of each of the chopper knives is located at least substantially on one side of a longitudinal center line of the chopper knife.

6. The crop residue chopper of claim 1, wherein the stiffener portion includes a longitudinally extending surface facing in the rotational direction including a generally concave surface portion extending sidewardly from the side surface and rearwardly relative to the rotational direction to a generally convex surface portion extending rearwardly relative to the rotational direction.

7. The crop residue chopper of claim 6, wherein both the concave surface portion and the convex surface portion are oriented at less than a 90 degree angle to the side surface.

8. The crop residue chopper of claim 1, wherein the stiffener portion is formed by stamping.

9. The crop residue chopper of claim 1, wherein each of the chopper knives has a sharpened longitudinally extending leading edge including an edge portion located adjacent to the free end portion and an edge portion spaced longitudinally from the free end portion, the edge portion located adjacent to the free end portion protruding in the rotational direction relative to the edge portion spaced longitudinally from the free end portion.

10. The crop residue chopper of claim 1, further comprising a plurality of fixed knives disposed in the housing along paths of rotation of at least one of the chopper knives, respectively, the chopper knives and the fixed knives being cooperable for chopping crop residue when the chopper knives are rotated.

11. A crop residue distribution system for an agricultural combine, comprising:
    a threshing mechanism disposed in the combine and operable for propelling a flow of crop residue rearwardly along a crop residue flow path through a rear end of the combine;
    a crop residue chopper including a chopper housing supported adjacent to a rear opening of the combine, the chopper housing including an inlet opening disposed in the crop residue flow path for receiving crop residue from the threshing mechanism, a discharge opening located rearwardly of and generally opposite the inlet opening, and an interior cavity extending between the inlet opening and the discharge opening defining a crop residue flow path through the housing, the chopper including a chopper mechanism supported in the interior cavity including a rotor drivingly rotatable in a predetermined rotational direction toward the discharge opening about a rotational axis, the rotor supporting a plurality of elongate chopper knives at angularly spaced locations therearound, respectively, for rotation therewith, each of the knives including a mounting end portion mounted on the rotor for pivotal movement forwardly and rearwardly in the rotational direction, a free end portion opposite the mounting end portion, a longitudinally extending sharpened leading edge facing in the rotational direction adjacent to the free end portion, and a side surface extending longitudinally between the free end portion and the mounting end portion and facing sidewardly relative to the rotational direction, the side surface including at least one elongate stiffener portion extending sidewardly therefrom at least generally longitudinally coextensive with the sharpened leading edge, the stiffener portion having a rounded profile shape when viewed longitudinally including a surface facing in the rotational direction which is oriented at less than a 90 degree angle relative to the side surface, wherein the stiffener portion terminates at a spaced distance from an endmost edge portion of the free end portion, further wherein the stiffener portion is operable for generating an air flow through the inlet opening into and through the cavity of the housing for inducting dust and particles of crop residue into the chopper when the rotor is rotated.

12. The system of claim 11, wherein each of the chopper knives comprises two of the stiffener portions extending in generally parallel relation one to the other.

13. The system of claim 11, wherein the at least one stiffener portion of each of the chopper knives is located at least substantially on one side of a longitudinal center line of the chopper knife.

14. The system of claim 11, wherein the surface of the stiffener portion includes a longitudinally extending generally concave surface portion extending sidewardly from the side surface and rearwardly relative to the rotational direction to a generally convex surface portion extending rearwardly relative to the rotational direction, both of the surface portions being oriented at less than a 90 degree angle to the side surface so as to limit build up of crop residue thereon during rotation of the rotor.

15. The system of claim 14, wherein both the concave surface portion and the convex surface portion are oriented at less than a 90 degree angle to the side surface.

16. The system of claim 11, wherein the stiffener portion is formed by stamping.

17. The system of claim 11, wherein each of the sharpened leading edge includes an edge portion located adjacent to the free end portion and an edge portion spaced longitudinally from the free end portion, the edge portion located adjacent to the free end portion protruding in the rotational direction relative to the edge portion spaced longitudinally from the free end portion.

18. The system of claim 11, further comprising a plurality of fixed knives disposed in the housing along paths of rotation of the chopper knives, respectively, the chopper knives when rotated being cooperable with the fixed knives for chopping crop residue flowing through the housing.

19. A method of removing airborne particulates from a rear end of an agricultural combine, comprising steps of:

providing a crop residue chopper including a chopper housing supported adjacent to a rear opening of a combine such that an inlet opening of the housing is disposed for receiving a flow of crop residue propelled rearwardly within the rear end, the chopper including a chopper mechanism supported in an interior cavity of the housing including a rotor drivingly rotatable in a predetermined rotational direction about a rotational axis, and a plurality of elongate chopper knives pivotally mounted on the rotor at angularly spaced locations therearound, respectively, each of the knives including a mounting end portion pivorally mounted to the rotor for pivotal movement in the rotational direction, a free end portion opposite the mounting end portion and having a longitudinally extending side surface extending longitudinally between the free end portion and the mounting end portion and facing sidewardly relative to the rotational direction, including at least one elongate longitudinally extending stiffener portion extending sidewardly therefrom, the stiffener portion having a bulbous profile shape when viewed longitudinally and being operable for generating an air flow through the inlet opening and into the interior cavity when the rotor is rotated, and wherein the stiffener portion terminates at a spaced distance from an endmost edge portion of the free end portion; and rotating the rotor and the knives about the rotational axis as crop residue flows into the inlet opening and when airborne particulates are present in the rear end of the combine adjacent to the inlet opening, so as to generate an air flow though the inlet opening into the interior cavity sufficient for inducting at least some of the airborne particulates into the chopper with the crop residue.

20. The method of claim 19, wherein the stiffener portion includes a longitudinally extending generally concave surface portion extending sidewardly from the side surface and rearwardly relative to the rotational direction to a generally convex surface portion extending rearwardly relative to the rotational direction, both of the surface portions being oriented at less than a 90 degree angle to the side surface so as to limit build up of crop residue thereon during rotation of the rotor.

21. The method of claim 20, wherein both the concave surface portion and the convex surface portion are oriented at less than a 90 degree angle to the side surface.

22. The method of claim 19, wherein each of the chopper knives comprises two of the stiffener portions extending in generally parallel relation one to the other.

23. The method of claim 19, wherein the at least one stiffener portion of each of the chopper knives is located at least substantially on one side of a longitudinal center line of the chopper knife.

24. The method of claim 19, wherein the chopper further comprises a plurality of fixed knives disposed in the housing along paths of rotation of at least one of the chopper knives, respectively, the chopper knives and the fixed knives being cooperable for chopping crop residue when the rotor and the chopper knives are rotated in relation thereto.

* * * * *